US008975304B2

(12) United States Patent
Visagie et al.

(10) Patent No.: US 8,975,304 B2
(45) Date of Patent: Mar. 10, 2015

(54) PRODUCTION OF HYDROCARBONS

(75) Inventors: Jacobus Lucas Visagie, Sasolburg (ZA);
Herman Preston, Vaalpark (ZA);
Abdool Muthalib Saib, Vanderbijlpark (ZA)

(73) Assignee: Sasol Technology (Proprietary) Limited, Johannesburg (ZA)

( * ) Notice: Subject to any disclaimer, the term of this patent is extended or adjusted under 35 U.S.C. 154(b) by 342 days.

(21) Appl. No.: 13/501,781

(22) PCT Filed: Sep. 23, 2010

(86) PCT No.: PCT/IB2010/054290
§ 371 (c)(1),
(2), (4) Date: Apr. 13, 2012

(87) PCT Pub. No.: WO2011/045692
PCT Pub. Date: Apr. 21, 2011

(65) Prior Publication Data
US 2012/0202899 A1    Aug. 9, 2012

Related U.S. Application Data

(60) Provisional application No. 61/251,064, filed on Oct. 13, 2009.

(30) Foreign Application Priority Data

Oct. 13, 2009  (ZA) ................. 2009/07133

(51) Int. Cl.
| | | |
|---|---|---|
| C07C 27/00 | (2006.01) | |
| C10G 2/00 | (2006.01) | |
| B01J 23/889 | (2006.01) | |
| B01J 23/89 | (2006.01) | |
| B01J 37/02 | (2006.01) | |
| B01J 37/18 | (2006.01) | |

(52) U.S. Cl.
CPC ............. *C10G 2/333* (2013.01); *B01J 23/8896* (2013.01); *B01J 23/8913* (2013.01); *B01J 37/0201* (2013.01); *B01J 37/0207* (2013.01); *B01J 37/0209* (2013.01); *B01J 37/18* (2013.01); *C10G 2/332* (2013.01); *C10G 2300/202* (2013.01)
USPC .......................... 518/715; 518/700

(58) Field of Classification Search
CPC .......... C10G 2/30; C10G 2/331; C10G 2/332; C10G 2/333; C10G 2/342; B01J 23/8913
USPC ................................. 518/700, 715
See application file for complete search history.

(56) References Cited

U.S. PATENT DOCUMENTS

| | | | |
|---|---|---|---|
| 5,733,839 | A | 3/1998 | Espinoza et al. |
| 5,939,350 | A | 8/1999 | Singleton et al. |
| 6,239,184 | B1 | 5/2001 | Beer et al. |
| 6,284,807 | B1 | 9/2001 | Leviness et al. |
| 6,638,889 | B1 | 10/2003 | Van Berge |
| 6,835,690 | B2 | 12/2004 | Van Berge |
| 7,022,742 | B2 | 4/2006 | Inga |
| 2005/0154069 | A1 | 7/2005 | Ingo et al. |
| 2007/0158241 | A1 | 7/2007 | Inga et al. |

FOREIGN PATENT DOCUMENTS

| | | |
|---|---|---|
| CN | 1386821 A | 12/2002 |
| CN | 101224425 A | 7/2008 |
| WO | 2005/071044 A1 | 8/2005 |
| WO | 2007/070833 A2 | 6/2007 |
| WO | 2009/127942 A2 | 10/2009 |
| WO | 2009/127950 A2 | 10/2009 |
| WO | 2009/127990 A1 | 10/2009 |
| WO | 2009127950 A2 | 10/2009 |

OTHER PUBLICATIONS

Diehl, et al., "Promotion of Cobalt Fischer-Tropsch Catalysts with Noble Metals: a Review", 2008, pp. 11-24, vol. 64, No. 1, Publisher: Oil & Gas Science & Technology, Published in: US.
Tsubaki, et al., "Different Functions of the Noble Metals Added to Cobalt Catalysts for Fischer-Tropsch Synthesis", 2001, pp. 236-246, vol. 199, Publisher: Journal of Catalysts, Published in: US.

*Primary Examiner* — Jafar Parsa
(74) *Attorney, Agent, or Firm* — Fellers, Snider, Blankenship, Bailey & Tippens, P.C.

(57) ABSTRACT

A process for producing hydrocarbons and, optionally, oxygenates of hydrocarbons is provided. A synthesis gas comprises hydrogen, carbon monoxide and N-containing contaminants selected from the group consisting of HCN, $NH_3$, NO, $R_xNH_{3-X}$, $R^1$—CN and heterocyclic compounds containing at least one nitrogen atom as a ring member of a heterocyclic ring of the heterocyclic compound. The N-containing contaminants constitute, in total, at least 100 vppb but less than 1 000 000 vppb of the synthesis gas. The synthesis gas is contacted at an elevated temperature and an elevated pressure, with a particulate supported Fischer-Tropsch synthesis catalyst. The catalyst comprises a catalyst support, Co in catalytically active form supported on the catalyst support, and a dopant selected from the group consisting of platinum (Pt), palladium (Pd), ruthenium (Ru) and/or rhenium (Re). The dopant level is expressed by a formula. Hydrocarbons and, optionally, oxygenates of hydrocarbons are obtained.

10 Claims, No Drawings

PRODUCTION OF HYDROCARBONS

THIS INVENTION relates to the production of hydrocarbons. More particularly, it relates to a process for producing hydrocarbons and, optionally, oxygenates of hydrocarbon.

Hydrocarbon synthesis from hydrogen and carbon monoxide in the presence of a Fischer-Tropsch catalyst is commonly known as Fischer-Tropsch synthesis (FTS). FTS forms part of Gas-To-Liquids, Coal-To-Liquids, and Biomass-To-Liquids processes in which natural gas, coal, and biomass respectively are usually converted by means of a three step process into liquid hydrocarbons. The three process steps are normally (i) production of synthesis gas (or 'syngas') comprising a mixture of hydrogen and carbon monoxide from natural gas, coal, or biomass, (ii) conversion of the syngas into a waxy syncrude by means of FTS, and (iii) a hydrocracking or hydrotreating step to convert the waxy syncrude into liquid transportation fuels such as diesel, petrol, jet fuel, as well as naphtha. As the aim of the FTS process is to make long chain hydrocarbons, $CH_4$ is unwanted and the $CH_4$ selectivity should hence be as low as possible. Furthermore, the $C_5^+$ selectivity should be as high as possible to maximize the long chain hydrocarbon production. Normally, a lower $CH_4$ selectivity translates into a higher $C_5^+$ selectivity.

When the FTS process is a so-called low temperature Fischer-Tropsch process, the conversion of the syngas into syncrude is normally effected at a relatively low temperature of from 180° C. to 270° C., and can be carried out in either a fixed bed reactor or a slurry phase reactor as a three phase process comprising a solids phase (catalyst), a gaseous phase (syngas and gaseous products) and a liquid phase (liquid products). The Fischer-Tropsch catalyst is then normally a particulate supported catalyst comprising an active catalyst component such as Co supported on a catalyst support. The catalyst usually also includes a dopant in the form of platinum (Pt), palladium (Pd), ruthenium (Ru) or rhenium (Re) which enhances the reduction of the active catalyst component during activation of the catalyst and thus increasing the activity of the catalyst. Platinum as a dopant is usually present in the catalyst at levels of at least 0.0025 g Pt/g active catalyst component.

Syngas used on laboratory scale is usually clean syngas which is free of unwanted contaminants, and it is this syngas that is used in most experimental work for FTS. However, commercially available syngas often contains some unwanted contaminants such as sulphur containing compounds, for example mercaptans, dihydrogen sulphide and COS, as well as nitrogen containing compounds, for example, ammonia ($NH_3$), hydrogen cyanide (HCN) and nitrogen oxide (NO). Generally, all these sulphur and nitrogen containing compounds have a negative impact on the FTS performance of supported cobalt catalysts since they deactivate the catalyst, resulting in loss of catalyst activity.

As regards nitrogen containing contaminants, $NH_3$ and HCN need to be removed to levels of substantially no $NH_3$ and HCN as taught by, for example, U.S. Pat. No. 7,022,742, or at least to $NH_3$ and HCN levels of less than 100 vppb (volume parts per billion), preferably less than 10 vppb, as taught by, for example, U.S. Pat. No. 6,284,807 and US 2007/0158241. The removal of $NH_3$ and HCN improves the lifetime of the supported cobalt catalysts, and thus reduces that part of the catalyst deactivation attributable to $NH_3$ and HCN poisoning. Purification of the syngas prior to FTS is, however, costly.

On the other hand, the Applicant is also aware of WO 2005/071044 which describes a FTS process using a syngas that contains 100-3000 vppb of HCN and/or $NH_3$. In the process of WO 2005/071044, the cobalt catalyst activity decreases by 35% to 50% due to HCN and $NH_3$. The reduced catalyst activity is counteracted by increasing the FTS temperature. However, increasing the FTS temperature normally leads to an unwanted increase in the $CH_4$ selectivity.

Surprisingly, it has now been found that, in a process for producing hydrocarbons by means of FTS, high levels of nitrogen contaminants can be tolerated while maintaining good catalyst activity and low catalyst $CH_4$ selectivity, thereby avoiding the cost of having to purify the syngas to remove all of, or substantially all of, such nitrogen contaminants. This is achieved by using a catalyst with dopant levels as specified below.

Thus, according to a first aspect of the invention, there is provided a process for producing hydrocarbons and, optionally, oxygenates of hydrocarbons, which process includes contacting a synthesis gas comprising hydrogen, carbon monoxide and N-containing contaminants selected from the group consisting of HCN, $NH_3$, NO, $R_xNH_{3-x}$ where R is an organic group and x is 1, 2 or 3, with R being the same or different when x is 2 or 3, $R^1$—CN where $R^1$ is an organic group, and heterocyclic compounds containing at least one nitrogen atom as a ring member of a heterocyclic ring of the heterocyclic compound, with the N-containing contaminants constituting, in total, at least 100 vppb but less than 1 000 000 vppb of the synthesis gas, at a temperature of at least 180° C. and a pressure of at least 10 bar(a) (1000 kPa(a)), with a particulate supported Fischer-Tropsch synthesis catalyst which comprises a catalyst support, Co in catalytically active form supported on the catalyst support, and a dopant selected from the group consisting of platinum (Pt), palladium (Pd), ruthenium (Ru), rhenium (Re) and a mixture of two or more thereof at a dopant level expressed by formula 1:

$$\frac{w}{0.024}Ru + \frac{x}{0.0030}Pd + \frac{y}{0.0025}Pt + \frac{z}{0.1}Re \le a$$

where
 w is expressed as g Ru/g Co;
 x is expressed as g Pd/g Co;
 y is expressed as g Pt/g Co;
 z is expressed as g Re/g Co; and
 0≤a<1,
to obtain hydrocarbons and, optionally, oxygenates of hydrocarbons, by means of Fischer-Tropsch synthesis reaction of the hydrogen with the carbon monoxide.

Thus, in one embodiment of the invention, a can be 0. In other words, the catalyst then contains no dopant. It was surprisingly found that when the syngas contains significant quantities of N-containing contaminants, the catalyst can thus even contain no dopant and still retain satisfactory activity. Even more surprisingly, the activity of the catalyst without dopant increases when the syngas contains significant quantities of N-containing contaminants, compared to a clean syngas.

However, in another embodiment of the invention, a may be larger than 0. In this embodiment, a may preferably be at least 0.07. More preferably, a may be at least 0.15. In some cases, a may be at least 0.30. Thus, it was also surprisingly found that when the syngas contains significant levels of N-containing contaminants, a reduction in the catalyst dopant level, as compared to what is conventionally required, is possible, while still retaining catalyst activity, and, importantly, achieving low $CH_4$ selectivity.

As indicated hereinbefore, a<1. Preferably, a<0.93. More preferably, a<0.80. Still more preferably, a<0.65. When the catalyst contains only Ru as dopant, w is thus less than 0.024 g Ru/g Co. Preferably, w<0.022 g Ru/g Co. More preferably, w<0.019 g Ru/g Co. Still more preferably, w<0.015 g Ru/g Co. In a particular embodiment, w<0.01 g Ru/g Co. When the catalyst contains only Pd as dopant, x is thus less than 0.0030 g Pd/g Co. Preferably, x<0.0028 g Pd/g Co. More preferably, x<0.0026 g Pd/g Co. When the catalyst contains only Pt as dopant, y is thus less than 0.0025 g Pt/g Co. Preferably, y<0.0023 g Pt/g Co. More preferably, y<0.0020 g Pt/g Co. Still more preferably, y<0.0016 g Pt/g Co. Still lower levels of Pt are preferred, namely where y<0.0011 g Pt/g Co. When the catalyst contains only Re as dopant, z is thus less than 0.1 g Re/g Co. Preferably, z<0.093 g Re/g Co. More preferably, z<0.080 g Re/g Co. Still more preferably, z<0.065 g Re/g Co, and even z<0.005 g Re/g Co. It will be appreciated that the above dopant levels may also apply where more than one dopant is used, provided that formula 1 is complied with.

The syngas may contain, in total, at least 200 vppb N-containing contaminants. Preferably, the syngas contains at least 250 vppb N-containing contaminants. More preferably, the syngas contains at least 500 vppb N-containing contaminants. Typically, the syngas contains at least 1000 vppb N-containing contaminants. Preferably, the syngas contains not more than 100 000 vppb N-containing contaminants. More preferably, the syngas contains not more than 20 000 vppb N-containing contaminants. Typically, the syngas may contain not more than 10 000 vppb N-containing contaminants. For example, in one embodiment of the invention, the syngas may contain about 2000 vppb N-containing contaminants. However, in another embodiment, the syngas may contain about 5000 vppb N-containing contaminants. Typically, when the syngas is that of a gas-to-liquid process, it contains HCN and $NH_3$ as N-containing contaminants; when it is that of a coal-to-liquids process, it contains $NH_3$ and NO as N-containing contaminants.

Preferably, R in $R_xNH_{3-x}$ is a hydrocarbyl group and/or an oxygenated hydrocarbyl group. More preferably, R in $R_xNH_{3-x}$ is an alkyl group and/or an alcohol. Preferably, x is 1 or 2. In a preferred embodiment of the invention $R_xNH_{3-x}$ is dipropylamine $(CH_3CH_2CH_2)_2NH$. Alternatively, $R_xNH_{3-x}$ can be diethanolamine or methyl-diethanolamine.

Preferably, $R^1$ in $R^1$—CN is a hydrocarbyl group. More preferably, $R^1$ in $R^1$—CN is an alkyl group. In one preferred embodiment of the invention, $R^1$ is methyl.

The heterocyclic compounds may include oxygen containing groups. Examples of such oxygen containing compounds and non-oxygen containing compounds are 4-piperidineoacetophenone (heterocyclic with oxygen), 1,4-bipiperidine (heterocyclic, no oxygen), 1-piperidinepropionitrile (monocyclic), and 3-piperidino-1,2-propanediol (monocyclic with oxygen).

The syngas may be substantially free of phosphorous containing compounds, especially one or more phosphines.

The process according to the invention may, as indicated hereinbefore, optionally also produce oxygenates of hydrocarbons. Preferably, the Fischer-Tropsch synthesis ('FTS') process is carried out for a period of more than 24 hours. Preferably, the FTS process is a three phase Fischer-Tropsch process. More preferably, the FTS process is a slurry bed Fischer-Tropsch process for producing a wax product.

The contacting of the synthesis gas or syngas with the particulate supported FTS catalyst may thus be effected in a fixed bed reactor, in a slurry bed reactor, or even in a fixed fluidized bed reactor. However, a three-phase slurry bed reactor is preferred.

The temperature at which the contacting of the synthesis gas with the catalyst is effected may be from 180° C. to 250° C. Typically, the contacting temperature may be about 210° C.-240° C.

The pressure at which the contacting is effected may be from 10 bar(a) (1000 kPa(a)) to 70 bar(a) (7000 kPa(a)).

The cobalt in catalytically active form may be in the form of clusters of crystallites or particles distributed over the support surfaces. However, more preferably, the particles or crystallites of the cobalt that are distributed over the support surfaces are not in the form of clusters.

The catalyst may contain from 5 to 70 g Co/100 g catalyst support. Preferably, the catalyst may contain from 15 to 50 g Co/100 g catalyst support.

The catalyst support may comprise a catalyst support basis and optionally one or more modifying components. The catalyst support basis may be selected from the group consisting of alumina, preferably alumina in the form of one or more aluminium oxides; silica ($SiO_2$); titania ($TiO_2$); magnesia (MgO); and zinc oxide (ZnO); and mixtures thereof. Preferably the support basis is selected from the group consisting of alumina in the form of one of more aluminium oxides; titania ($TiO_2$) and silica $SiO_2$. More preferably, the support basis is alumina in the form of one or more aluminium oxides. The support basis may be a commercially available product, for example, Puralox (trade name) (available from Sasol Germany).

Preferably, the catalyst support includes one or more modifying components. This is especially the case where the support basis is soluble in a neutral and/or an acidic aqueous solution, or where the support basis is susceptible to hydrothermal attack as described below.

The modifying component, when present, may comprise a component that causes one or more of the following:
 (i) decreases the dissolution of the catalyst support in an aqueous environment;
 (ii) suppresses the susceptibility of the catalyst support to hydrothermal attack (especially during Fischer-Tropsch synthesis);
 (iii) increases the pore volume of the catalyst support;
 (iv) increases the strength and/or attrition and/or abrasion resistance of the catalyst support.

In a preferred embodiment of the invention, the modifying component decreases the dissolution of the catalyst support in an aqueous environment and/or suppresses the susceptibility of the catalyst support to hydrothermal attack (especially during Fischer-Tropsch synthesis). Such an aqueous environment may include an aqueous acid solution and/or an aqueous neutral solution, especially such an environment encountered during an aqueous phase impregnation catalyst preparation step. Hydrothermal attack is considered to be the sintering of the catalyst support (for example aluminium oxide) during hydrocarbon synthesis, especially Fischer-Tropsch synthesis, due to exposure to high temperature and water.

The modifying component may include or consist of Si, Zr, Co, Ti, Cu, Zn, Mn, Ba, Ni, Na, K, Ca, Sn, Cr, Fe, Li, Ti, Sr, Ga, Sb, V, Hf, Th, Ce, Ge, U, Nb, Ta, La and mixtures of one or more thereof. More particularly, the modifying component may be selected from the group consisting of Si; Zr; Cu; Zn; Mn; Ba; La; Ni and mixtures of two or more thereof. Preferably, the modifying component is selected from the group consisting of Si and Zr. In a preferred embodiment of the invention, the modifying component is Si.

In one preferred embodiment of the invention, the catalyst support may comprise a catalyst support basis, which optionally includes a modifying component selected from Si and Zr, and with the catalyst support basis being selected from the group consisting of alumina in the form of one or more aluminium oxides; silica ($SiO_2$) and titania ($TiO_2$). Preferably, the catalyst support basis is the alumina in the form of one or more aluminium oxides. It preferably then includes a modifying component which is preferably selected from Si and Zr, more preferably Si. In another preferred embodiment of the invention, the catalyst support may be selected from alumina in the form of one or more aluminium oxides, silica ($SiO_2$), titania ($TiO_2$), magesia (MgO), silica modified aluminium oxide, and mixtures thereof. Preferably, the support is then a silica modified aluminium oxide, for example the product obtainable under the trademark Siralox from Sasol Germany. Siralox is a spray-dried silica containing aluminium oxide support. The silica modified aluminium oxide support may be the product described in U.S. Pat. No. 5,045,519 which is incorporated herein by reference.

The one or more aluminium oxides may be selected from the group including or, preferably, consisting of, gamma alumina, delta alumina, theta alumina and a mixture of two or more thereof. Preferably, the group includes, or, preferably, consists of gamma alumina, delta alumina and a mixture of gamma alumina and delta alumina. The aluminium oxide catalyst support may be that obtainable under the trademark Puralox, preferably Puralox SCCa2/150 from SASOL Germany GmbH. Puralox SCCa 2/150 (trademark) is a spray-dried aluminium oxide support consisting of a mixture of gamma and delta aluminium oxide.

The aluminium oxide is preferably a crystalline compound which can be described by the formula $Al_2O_3 \cdot xH_2O$ where $0<x>1$. The term "aluminium oxide" thus excludes $Al(OH)_3$, AlO(OH), but includes compounds such as gamma, delta and theta alumina.

In one embodiment of the invention, a catalyst support in the form of one or more aluminium oxides or a silica modified aluminium oxide is preferred over supports such as silica and titania, since it is believed that such supports provide a much more attrition resistant catalyst than do silica and titania supports. The catalyst support in the form of one or more aluminium oxides or a silica modified aluminium oxide may also include La. It is believed that La improves attrition resistance.

In one embodiment of the invention, a catalyst support in the form of one or more aluminium oxides or a silica modified aluminium oxide may include titanium, preferably in an amount, expressed as elemental titanium, of at least 500 ppm by weight. Preferably, the titanium, expressed as elemental titanium, may be present in the catalyst support from about 1000 ppm to about 2000 ppm by weight. It is believed that the addition of the titanium increases the activity of a catalyst formed from such a support, especially in the case of a cobalt FT catalyst, particularly when no noble metal promoters and preferably no Re or Te promoters are present in the catalyst. Preferably, the titanium is then included in the internal structure of the support. It is then also preferred that no titanium be deposited onto the support outer surfaces. It is believed that the addition of this titanium in the support also improves the attrition resistance of a catalyst formed from such a support.

The catalyst support may be a porous support.

In one embodiment of the invention, the catalyst support may comprise porous particles coated with carbon. In an alternative embodiment of the invention, the porous particles may be free of such a carbon coating.

The catalyst may thus comprise a silicon modified aluminium oxide catalyst support, with the cobalt being in its metallic state so as to be in its catalytically active form.

More specifically, the modified catalyst support may be that obtained by contacting a silicon precursor, e.g. an organic silicon compound such as tetra ethoxy silane ('TEOS') or tetra methoxy silane ('TMOS') with the catalyst support, e.g. by means of impregnation, precipitation or chemical vapour deposition, to obtain a silicon-containing modified catalyst support; and calcining the silicon-containing modified catalyst support, e.g. in a rotary calciner, at a temperature from 100° C. to 800° C., and for a period of from 1 minute to 12 hours. Preferably, the calcination temperature may be from 450° C. to 550° C.; the calcination period is preferably from 0.5 hours to 4 hours.

The process may include subjecting the hydrocarbons and, if present, the oxygenates of hydrocarbons, to hydroprocessing, thereby to covert them to liquid fuels and/or to chemicals According to a second aspect of the present invention, there is provided the use of a particulate supported Fischer-Tropsch synthesis catalyst which comprises a catalyst support, Co in catalytically active form supported on the catalyst support, and a dopant selected from the group consisting of platinum (Pt), palladium (Pd), ruthenium (Ru), rhenium (Re) and a mixture of two or more thereof at a dopant level expressed by formula 1:

$$\frac{w}{0.024}Ru + \frac{x}{0.0030}Pd + \frac{y}{0.0025}Pt + \frac{z}{0.1}Re \leq a$$

where
w is expressed as g Ru/g Co;
x is expressed as g Pd/g Co;
y is expressed as g Pt/g Co;
z is expressed as g Re/g Co; and
$0 \leq a < 1$,
in a process for producing hydrocarbons and, optionally, oxygenates of hydrocarbons, which process includes contacting a synthesis gas comprising hydrogen, carbon monoxide and N-containing contaminants selected from the group consisting of HCN, $NH_3$, NO, $R_xNH_{3-x}$ where R is an organic group and x is 1, 2 or 3, with R being the same or different when x is 2 or 3, and $R^1$—CN where $R^1$ is an organic group, and heterocyclic compounds containing at least one nitrogen atom as a ring member of a heterocyclic ring of the heterocyclic compound, with the N-containing contaminants constituting, in total, at least 100 vppb but less than 1 000 000 vppb of the synthesis gas, at a temperature of at least 180° C. and a pressure of at least 10 bar(a) (1000 kPa(a)), with the catalyst, to obtain hydrocarbons by means of Fischer-Tropsch synthesis reaction of the hydrogen with the carbon monoxide.

The catalyst, synthesis gas, Fischer-Tropsch synthesis, and the contacting of the catalyst with the synthesis gas may be as hereinbefore described with reference to the first aspect of the invention.

Preferably the catalyst is used in the process in order to reduce methane selectivity of the Fischer-Tropsch synthesis ('FTS') reaction.

The invention will now be described in more detail with reference to the following non-limiting examples.

EXAMPLES 1-5

Using Pt as Dopant

Several Fischer-Tropsch synthesis ("FTS") catalysts containing 30 g Co/100 g support (1.5 g Si/100 g Puralox SCCa 2/150) and promoted with Pt were prepared on a particulate modified 1.5 g Si/100 g Puralox SCCa 2/150 (trademark) pre-shaped support using aqueous slurry phase impregnation and drying, followed by direct fluidised bed calcination in air, and reduction in hydrogen.

Catalyst Examples 1-5 contained different levels of Pt reduction promoter:

Example 1 (invention): 0 g Pt/g Co
Example 2 (invention): 0.00083 g Pt/g Co
Example 2A (invention): 0.0010 g Pt/g Co
Example 3 (comparative): 0.0025 g Pt/g Co
Example 4 (comparative): 0.0050 g Pt/g Co
Example 5 (comparative): 0.0167 g Pt/g Co In particular, the particulate supported FTS catalyst of Example 3 was prepared as follows:

43.70 g $Co(NO_3)_2 \cdot 6H_2O$ were dissolved in 40 ml distilled water, and 0.024 g of $Pt(NH_3)_4 \cdot (NO_3)_2$ (dissolved in 10 ml distilled water) were added to this solution, whereafter 50.0 g of the 1.5 g Si/100 g Puralox SCCa 2/150 modified pre-shaped support were added to the solution. Aqueous slurry phase impregnation and vacuum drying were effected, while increasing the temperature from 60° C. to 85° C. This vacuum dried intermediate was directly subjected to a fluidized bed calcination step using a continuous air flow of 1.7 $dm^3_n$/min, while increasing the temperature from 25° C. to 250° C. at 1° C./min and keeping it at 250° C. for 6 hours. 50.0 g of this intermediate calcined material was subjected to the following $2^{nd}$ cobalt/platinum impregnation and calcination step: 23.51 g $Co(NO_3)_2 \cdot 6H_2O$ was dissolved in 40 ml distilled water and 0.039 g of $Pt(NH_3)_4 \cdot (NO_3)_2$ (dissolved in 10 ml distilled water) were added to this solution, whereafter 50.0 g of the ex $1^{st}$ cobalt/platinum impregnated and calcined intermediate was added. Aqueous slurry phase impregnation and vacuum drying were effected, while increasing the temperature from 60° C. to 85° C. This vacuum dried intermediate was directly subjected to a fluidized bed calcination step, according to the following procedure using a continuous air flow of 1.7 $dm^3_n$/min, while increasing the temperature from 25° C. to 250° C. at 1° C./min and keeping it at 250° C. for 6 hours.

This calcined catalyst intermediate or precursor was reduced at 1 bar (100 kPa) in pure $H_2$ (space velocity=2000 $ml_n$ $H_2$/g catalyst/h) whilst the temperature was increased from 25° C. to 425° C. at a rate of 1° C./min whereafter the temperature was kept constant at this temperature of 425° C. for 16 hours. This provided a particulate porous supported FTS catalyst which comprises alumina in the form of one or more aluminium oxides and Co metal that is in the catalytically active form of cobalt, supported on the catalyst support. The dopant in this case is Pt.

The catalysts of Examples 1, 2, 2A, 3, 4, and 5 were prepared in the same manner, apart from adjusting the amount of platinum precursor to ensure that the correct composition was obtained. The catalysts of Examples 1, 2 and 2A are according to the invention, while the catalysts of Examples 3, 4, and 5 are comparative.

EXAMPLE 6

Using Clean Syngas

The catalysts of Examples 1-5 were tested in a fixed bed high throughput reactor system, using FTS inlet conditions of about 3.0 bar(a) (300 kPa(a)) $H_2O$, 6.3 bar(a) (630 kPa(a)) $H_2$ and 4.5 bar(a) (450 kPa(a)) CO, having a total pressure of 15 bar(a) (1500 kPa(a)) and obtaining outlet conditions of around 4.4 bar(a) (440 kPa(a)) $H_2O$, 4.6 bar(a) (460 kPa(a)) $H_2$ and 3.9 bar(a) (390 kPa(a)) CO, which was achieved with a syngas conversion of around 25%. Reaction temperatures of 230° C. and 210° C. were tested. The syngas feed was clean and did not contain any nitrogen containing compounds.

After five days of operation, the relative activity and $CH_4$ selectivity data obtained were as reported in Tables 1 and 2. $CH_4$ selectivity data are a good indicator for total hydrocarbon and $C_5^+$ selectivity as they are normally directly linked, i.e. the lower the $CH_4$ selectivity the higher the $C_5^+$ selectivity is.

The relative activity was calculated using a generic cobalt Fischer-Tropsch kinetic equation and comparing each tested catalyst with an internal reference catalyst.

EXAMPLE 7

With HCN in the Syngas

The catalysts of Examples 1-5 were tested in a fixed bed high throughput reactor system, using FTS inlet conditions of about 3.0 bar(a) (300 kPa(a)) $H_2O$, 6.3 bar(a) (630 kPa(a)) $H_2$ and 4.5 bar(a) (450 kPa(a)) CO, having a total pressure of 15 bar(a) (1500 kPa(a)) and obtaining outlet conditions of around 4.4 bar(a) (440 kPa(a)) $H_2O$, 4.6 bar(a) (460 kPa(a)) $H_2$ and 3.9 bar(a) (390 kPa(a)) CO. Reaction temperatures of 230° C. and 210° C. were tested. The syngas feed contained 5000 vppb HCN.

After five days of operation, the relative activity and $CH_4$ selectivity data obtained were as reported in Table 1.

TABLE 1

Relative activity and $CH_4$ selectivity after five days of FTS at 230° C. for Examples 1-5 using (i) a clean synthesis gas feed, not containing any N-containing compounds and (ii) a synthesis gas feed containing 5000 vppb HCN.

| Catalyst | Pt level (g Pt/g Co) | Relative activity (clean gas; no N contaminant) | Relative activity (5000 vppb HCN) | % $CH_4$ (C atom %) (clean gas; no N contaminant) | % $CH_4$ (C atom %) (5000 vppb HCN) |
|---|---|---|---|---|---|
| Example 1 (invention) | 0 | 1.8 | 2.4 | 6.3 | 4.6 |
| Example 2 (invention) | 0.00083 | 3.8 | 2.9 | 5.7 | 5.0 |
| Example 3 (comparative) | 0.0025 | 4.0 | 2.8 | 6.0 | 5.1 |
| Example 4 (comparative) | 0.0050 | 4.1 | 2.7 | 6.0 | 5.3 |
| Example 5 (comparative) | 0.0167 | 4.1 | 2.6 | 6.5 | 5.5 |

Error in activity is ±0.1 units and error in $CH_4$ selectivity is ±0.1 percentage point.

EXAMPLE 8

With $NH_3$ in the Syngas

The catalysts of Examples 1-5 were tested in a fixed bed high throughput reactor system, using FTS inlet conditions of about 3.0 bar(a) (300 kPa(a)) $H_2O$, 6.3 bar(a) (630 kPa(a)) $H_2$ and 4.5 bar(a) (450 kPa(a)) CO, and obtaining outlet conditions of around 4.4 bar(a) (440 kPa(a)) $H_2O$, 4.6 bar(a) (460 kPa(a)) $H_2$ and 3.9 bar(a) (390 kPa(a)) CO, which was achieved with a syngas conversion of around 25%. Reaction temperatures of 230° C. and 210° C. were used. The syngas feed contained 5000 vppb $NH_3$.

After five days of operation, the relative activity and $CH_4$ selectivity data obtained were as reported in Table 2.

TABLE 2

Relative activity and $CH_4$ selectivity after five days of FTS at 230° C. for Examples 1-5 using (i) a clean synthesis gas feed, not containing any N-containing compounds (Example 6) and (ii) a synthesis gas feed containing 5000 vppb $NH_3$.

| Catalyst | Pt level (g Pt/g Co) | Relative activity (clean gas; no N contaminant) | Relative activity (5000 vppb $NH_3$) | % $CH_4$ (C atom %) (clean gas; no N contaminant) | % $CH_4$ (C atom %) (5000 vppb $NH_3$) |
|---|---|---|---|---|---|
| Example 1 (invention) | 0 | 1.8 | 2.8 | 6.3 | 4.8 |
| Example 2 (invention) | 0.00083 | 3.8 | 3.2 | 5.7 | 5.2 |
| Example 3 (comparative) | 0.0025 | 4.0 | 3.1 | 6.0 | 5.3 |
| Example 4 (comparative) | 0.0050 | 4.1 | 2.9 | 6.0 | 5.5 |
| Example 5 (comparative) | 0.0167 | 4.1 | 2.8 | 6.5 | 5.6 |

Error in activity is ±0.1 units and error in $CH_4$ selectivity is ±0.1 percentage point.

EXAMPLE 9

With Diethanolamine {DEA} in the Syngas

The catalyst of Example 2A (invention, 0.001 g Pt/g Co) was tested in a fixed bed high throughput reactor system, using FTS inlet conditions of about 3.0 bar(a) (300 kPa(a)) $H_2O$, 6.3 bar(a) (630 kPa(a)) $H_2$ and 4.5 bar(a) (450 kPa(a)) CO, having a total pressure of 15 bar(a) (1500 kPa(a)) and obtaining outlet conditions of around 4.4 bar(a) (440 kPa(a)) $H_2O$, 4.6 bar(a) (460 kPa(a)) $H_2$ and 3.9 bar(a) (390 kPa(a) CO. Reaction temperatures of 230° C. and 210° C. were tested. The syngas feed contained (i) 100 vppb DEA and (ii) 1000 vppb DEA.

After five days of operation, the relative activity and $CH_4$ selectivity data obtained were as reported in Table 3.

TABLE 3

Relative activity and $CH_4$ selectivity after 5 days of FTS at 230° C. for Example 2A using (i) a clean synthesis gas feed, not containing any N-containing compounds; (ii) a synthesis gas feed containing 100 vppb DEA; and (iii) a synthesis gas feed containing 1000 vppb DEA.

| DEA level in syngas feed | Relative activity | % $CH_4$ (C atom %) |
|---|---|---|
| 0 vppb (clean gas) | 3.9 | 5.8 |
| 100 vppb | 3.9 | 5.7 |
| 1000 vppb | 3.5 | 5.3 |

Error in activity is ±0.1 units and error in $CH_4$ selectivity is ±0.1 percentage point.

It can be concluded from Table 3 that there is no notable activity loss when 100 vppb DEA is present, but indeed some activity loss when 1000 vppb DEA is present. There is a small selectivity gain in lower methane produced when 100 vppb DEA is present, but a more notable gain in methane produced when 1000 vppb DEA is present.

EXAMPLE 10

With methyl-diethanolamine {mDEA} in the Syngas

The catalyst of Example 2A (invention, 0.001 g Pt/g Co) was tested in a fixed bed high throughput reactor system, using FTS inlet conditions of about 3.0 bar(a) (300 kPa(a)) $H_2O$, 6.3 bar(a) (630 kPa(a)) $H_2$ and 4.5 bar(a) (450 kPa(a)) CO, having a total pressure of 15 bar(a) (1500 kPa(a)) and obtaining outlet conditions of around 4.4 bar(a) (440 kPa(a)) $H_2O$, 4.6 bar(a) (460 kPa(a)) $H_2$ and 3.9 bar(a) (390 kPa(a)) CO. Reaction temperatures of 230° C. and 210° C. were tested. The syngas feed contained (i) 100 vppb mDEA and (ii) 1000 vppb mDEA.

After five days of operation, the relative activity and $CH_4$ selectivity data obtained were as reported in Table 4.

TABLE 4

Relative activity and $CH_4$ selectivity after 5 days of FTS at 230° C. for Example 2A using (i) a clean synthesis gas feed, not containing any N-containing compounds; (ii) a synthesis gas feed containing 100 vppb mDEA; and (iii) a synthesis gas feed containing 1000 vppb mDEA.

| mDEA level in syngas feed | Relative activity | % $CH_4$ (C atom %) |
|---|---|---|
| 0 vppb (clean gas) | 3.9 | 5.8 |
| 100 vppb | 3.8 | 5.7 |
| 1000 vppb | 3.2 | 5.1 |

Error in activity is ±0.1 units and error in $CH_4$ selectivity is ±0.1 percentage point.

It can be concluded from Table 4 that there is a small activity loss when 100 vppb mDEA is present, but indeed greater activity loss when 1000 vppb mDEA is present. There is a small selectivity gain in lower methane produced when 100 vppb mDEA is present, but a more notable gain in methane produced when 1000 vppb mDEA is present.

EXAMPLE 11

With CH₃CN in the Syngas

The catalysts of Examples 2A and 3 were tested in a fixed bed high throughput reactor system, using FTS inlet conditions of about 3.0 bar(a) (300 kPa(a)) $H_2O$, 6.3 bar(a) (630 kPa(a)) $H_2$ and 4.5 bar(a) (450 kPa(a)) CO, having a total pressure of 15 bar(a) (1500 kPa(a)) and obtaining outlet conditions of around 4.4 bar(a) (440 kPa(a)) $H_2O$, 4.6 bar(a) (460 kPa(a)) $H_2$ and 3.9 bar(a) (390 kPa(a)) CO. Reaction temperatures of 230° C. and 210° C. were tested. The syngas feed contained (i) 500 vppb $CH_3CN$; (ii) 1000 vppb $CH_3CN$ and (iii) 5000 vppb $CH_3CN$.

After five days of operation, the relative activity and $CH_4$ selectivity data obtained were as reported in Table 5.

TABLE 5

Relative activity and $CH_4$ selectivity after 5 days of FTS at 230° C. for Examples 2A and 3 using (i) a clean synthesis gas feed, not containing any N-containing compounds; (ii) a synthesis gas feed containing 500 vppb $CH_3CN$; (iii) a synthesis gas feed containing 1000 vppb $CH_3CN$ and (iv) a synthesis gas feed containing 5000 vppb $CH_3CN$.

| $CH_3CN$ level in syngas feed | Relative activity for Example 2A (invention, 0.001 g Pt/g Co) | % $CH_4$ (C atom %) for Example 2A (invention, 0.001 g Pt/g Co) | Relative activity for Example 3 (comparative, 0.0025 g Pt/g Co) | % $CH_4$ (C atom %) for Example 3 (comparative, 0.0025 g Pt/g Co) |
|---|---|---|---|---|
| 0 vppb (clean gas) | 3.9 | 5.8 | 4.0 | 6.0 |
| 500 vppb | 3.2 | 4.8 | 3.1 | 5.1 |
| 1000 vppb | 3.1 | 4.7 | 3.0 | 5.0 |
| 5000 vppb | 3.0 | 4.6 | 3.0 | 4.9 |

Error in activity is ±0.1 units and error in $CH_4$ selectivity is ±0.1 percentage point.

It can be concluded from Table 5 that there is a substantial activity loss when 500 vppb $CH_3CN$ is present, but then it seems to stabilize out when the $CH_3CN$ level is increased. There is also a substantial selectivity gain in lower methane when 500 vppb $CH_3CN$ is present, which also seems to stabilize out when higher levels are present. The selectivity gain is larger for Example 2A, which contains less Pt than for Example 3, which contains more Pt.

EXAMPLE 12

Using Clean Syngas

The catalysts of Examples 2A and 3 were tested in a slurry-phase micro-reactor system, using FTS inlet conditions of about 0 bar(a) (0 kPa(a)) $H_2O$, 9.4 bar(a) (940 kPa(a)) $H_2$ and 5.7 bar(a) (570 kPa(a)) CO, having a total pressure of 18 bar(a) (1800 kPa(a)) and obtaining outlet conditions of around 4.5 bar(a) (450 kPa(a)) $H_2O$, 4.3 bar(a) (430 kPa(a)) $H_2$ and 3.8 bar(a) (380 kPa(a)) CO, which was achieved with a syngas conversion of around 63%. A reaction temperature of 230° C. was used. The syngas feed was clean and did not contain any nitrogen containing compounds.

After 30 days of operation, the relative activity and $CH_4$ selectivity data obtained were as reported in Table 6. As indicated hereinbefore, $CH_4$ selectivity data are a good indicator for total hydrocarbon and $C_5^+$ selectivity as they are normally directly linked, i.e. the lower the $CH_4$ selectivity the higher the $C_5^+$ selectivity is.

The relative activity was calculated using a generic cobalt Fischer-Tropsch kinetic equation and comparing each tested catalyst with an internal reference catalyst.

EXAMPLE 13

With HCN in the Syngas

The catalysts of Examples 2A and 3 were tested in a slurry-phase micro-reactor system, using FTS inlet conditions of about 0 bar(a) (0 kPa(a)) $H_2O$, 9.4 bar(a) (940 kPa(a)) $H_2$ and 5.7 bar(a) (570 kPa(a)) CO, having a total pressure of 18 bar(a) (1500 kPa(a)) and obtaining outlet conditions of around 4.5 bar(a) (450 kPa(a)) $H_2O$, 4.3 bar(a) (430 kPa(a)) $H_2$ and 3.8 bar(a) (380 kPa(a)) CO, which was achieved with a syngas conversion of around 63%. A reaction temperature of 230° C. was used. The syngas feed contained 2000 vppb HCN.

After 30 days of operation, the relative activity and $CH_4$ selectivity data obtained were as reported in Table 6.

TABLE 6

Relative activity and $CH_4$ selectivity after 30 days of FTS at 230° C. for Examples 2A and 3 using (i) a clean synthesis gas feed, not containing any N-containing compounds and (ii) a synthesis gas feed containing 2000 vppb HCN.

| Catalyst | Pt level (g Pt/g Co) | Relative activity (clean gas; no N contaminant) | Relative activity (2000 vppb HCN) | % $CH_4$ (C atom %) (clean gas; no N contaminant) | % $CH_4$ (C atom %) (2000 vppb HCN) |
|---|---|---|---|---|---|
| Example 2A (invention) | 0.001 | 3.3 | 2.5 | 6 | 4.5 |
| Example 3 (comparative) | 0.0025 | 3.2 | 2.5 | 6.3 | 5.3 |

Error in activity is ±0.1 units and error in $CH_4$ selectivity is ±0.1 percentage point.

EXAMPLE 14

With NO in the Syngas

The catalyst of Example 3 (comparative, 0.0025 g Pt/g Co) were tested in a slurry-phase micro-reactor system, using FTS inlet conditions of about 0 bar(a) (0 kPa(a)) $H_2O$, 9.4 bar(a) (940 kPa(a)) $H_2$ and 5.7 bar(a) (570 kPa(a)) CO, having a total pressure of 18 bar(a) (1800 kPa(a)) and obtaining outlet conditions of around 4.5 bar(a) (450 kPa(a)) $H_2O$, 4.3 bar(a) (430 kPa(a)) $H_2$ and 3.8 bar(a) (380 kPa(a)) CO, which was achieved with a syngas conversion of around 63%. A reaction temperature of 230° C. was used. The syngas feed contained 2000 vppb NO.

After 30 days of operation, the relative activity and $CH_4$ selectivity data obtained were as reported in Table 7a.

EXAMPLE 15

With $CH_3CN$ in the Syngas

The catalyst of Example 3 (comparative, 0.0025 g Pt/g Co) were tested in a slurry-phase micro-reactor system, using FTS inlet conditions of about 0 bar(a) (0 kPa(a)) $H_2O$, 9.4 bar(a) (940 kPa(a)) $H_2$ and 5.7 bar(a) (570 kPa(a)) CO, having a total pressure of 18 bar(a) (1800 kPa(a)) and obtaining outlet conditions of around 4.5 bar(a) (450 kPa(a)) $H_2O$, 4.3 bar(a) (430 kPa(a)) $H_2$ and 3.8 bar(a) (380 kPa(a)) CO, which was achieved with a syngas conversion of around 63%. A reaction temperature of 230° C. was used. The syngas feed contained 2000 vppb $CH_3CN$.

After 30 days of operation, the relative activity and $CH_4$ selectivity data obtained were as reported in Table 7a.

Similar tests were done with $CH_3CN$ at levels of 2000 vppb, 10 000 vppb, and 100 000 vppb $CH_3CN$. After 10 days of operation, the relative activity and $CH_4$ selectivity data obtained were as reported in Table 7b.

TABLE 7a

Relative activity and $CH_4$ selectivity after 30 days of FTS at 230° C. for Example 3 (i.e. comparative) using (i) a clean synthesis gas feed, not containing any N-containing compounds; (ii) a synthesis gas feed containing 2000 vppb HCN (Example 13); (iii) a synthesis gas feed containing 2000 vppb NO (Example 14); and (iv) a synthesis gas feed containing 2000 vppb $CH_3CN$ (Example 15).

| Poison in syngas feed | Relative activity | % $CH_4$ (C atom %) |
|---|---|---|
| Clean gas, no N contaminant | 3.2 | 6.3 |
| 2000 vppb HCN | 2.5 | 5.3 |
| 2000 vppb NO | 2.7 | 5.2 |
| 2000 vppb $CH_3CN$ | 2.5 | 5.4 |

Error in activity is ±0.1 units and error in $CH_4$ selectivity is ±0.1 percentage point.

TABLE 7b

Relative activity and $CH_4$ selectivity after 10 days of FTS at 230° C. for Example 3 (i.e. comparative) using (i) a clean synthesis gas feed, not containing any N-containing compounds; (ii) a synthesis gas feed containing 2000 vppb, 10 000 vppb and 100 000 vppb $CH_3CN$ (Example 15).

| Poison in syngas feed | Relative activity | % $CH_4$ (C atom %) |
|---|---|---|
| Clean gas, no N contaminant | 3.8 | 6.3 |
| 2000 vppb $CH_3CN$ | 2.7 | 5.2 |
| 10 000 vppb $CH_3CN$ | 2.4 | 4.3 |
| 100 000 vppb $CH_3CN$ | 2.2 | 4.1 |

Error in activity is ±0.1 units and error in $CH_4$ selectivity is ±0.1 percentage point.

EXAMPLE 16

Using Different Levels of HCN in the Syngas

The catalyst of Example 3 (comparative, 0.0025 g Pt/g Co) were tested in a slurry-phase micro-reactor system, using FTS inlet conditions of about 0 bar(a) (0 kPa(a)) $H_2O$, 9.4 bar(a) (940 kPa(a)) $H_2$ and 5.7 bar(a) (570 kPa(a)) CO, having a total pressure of 18 bar(a) (1800 kPa(a)) and obtaining outlet conditions of around 4.5 bar(a) (450 kPa(a)) $H_2O$, 4.3 bar(a) (430 kPa(a)) $H_2$ and 3.8 bar(a) (380 kPa(a)) CO, which was achieved with a syngas conversion of around 63%. A reaction temperature of 230° C. was used. The syngas feed contained (i) 100 vppb HCN; (ii) 200 vppb HCN; (iii) 250 vppb HCN; (iv) 500 vppb HCN; (v) 2000 vppb HCN; (vi) 3000 vppb HCN; and (vii) 6000 vppb HCN.

After 30 days of operation, the relative activity and $CH_4$ selectivity data obtained were as reported in Table 8.

TABLE 8

Relative activity and $CH_4$ selectivity after 30 days of FTS at 230° C. for Example 3 using (i) a clean synthesis gas feed, not containing any N-containing compounds; (ii) a synthesis gas feed containing 100 vppb HCN; (iii) a synthesis gas feed containing 200 vppb HCN; (iv) a synthesis gas feed containing 250 vppb HCN; (v) a synthesis gas feed containing 500 vppb HCN; (vi) a synthesis gas feed containing 2000 vppb HCN; (vii) a synthesis gas feed containing 3000 vppb HCN; and (viii) a synthesis gas feed containing 6000 vppb HCN.

| HCN level in syngas feed | Relative activity | % $CH_4$ (C atom %) |
|---|---|---|
| 0 vppb (clean gas) | 3.2 | 6.3 |
| 100 vppb | 3.2 | 6.1 |
| 200 vppb | 3.2 | 6 |
| 250 vppb | 3 | 5.8 |
| 500 vppb | 2.8 | 5.5 |
| 2000 vppb | 2.5 | 5.3 |
| 3000 vppb | 2.5 | 5.3 |
| 6000 vppb | 2.4 | 5 |

Error in activity is ±0.1 units and error in $CH_4$ selectivity is ±0.1 percentage point.

It can be concluded from Table 8 that there is no notable activity loss at the lower levels of 100 and 200 vppb HCN, some activity loss at 250 vppb HCN, more at 500 vppb HCN, and more at 2000 vppb HCN after which it seems to stabilize.

The gain in selectivity (lower methane production) is between 3 and 20% for all of these HCN levels, and from 500 vppb and onwards it seems to stabilize.

It can be concluded from Tables 1 to 8 that the catalyst activity of Pt containing cobalt catalysts decreases when using a syngas feed that contains nitrogen containing compounds such as HCN, $NH_3$, NO, $CH_3CN$, DEA, and mDEA.

It can surprisingly also be concluded from Tables 1 to 8 that for the Pt containing catalysts
- When performing FTS in the presence of nitrogen containing compounds such as HCN, $NH_3$, NO, $CH_3CN$, DEA, and mDEA the activity loss is less for catalysts containing less Pt
- The order of the activity is reversed in the presence of nitrogen containing compounds, i.e. the lower the catalyst Pt level the higher its activity (when nitrogen containing compounds, are present in the syngas)
- The selectivity gain is the highest for the lowest Pt levels in the presence of nitrogen containing compounds It can also surprisingly be concluded from Table 1 that for the unpromoted cobalt catalyst
- both the activity and selectivity are improved in the presence of nitrogen containing compounds such as HCN or $NH_3$ Regarding the $CH_4$ selectivity a similar pattern was observed for FTS tests using the catalysts of Examples 1-5 and which were performed at 210° C. instead of 230° C., but its effects were less pronounced at 210° C. On the activity side, the negative effect of the N containing compounds was worse at 210° C.

EXAMPLES 17 and 18

Using Pd as Dopant

Two Fischer-Tropsch synthesis ("FTS") catalysts containing 30 g Co/100 g Support (1.5 g Si/100 g Puralox SCCa 2/150) and promoted with Pd were prepared on a particulate modified 1.5 g Si/100 g Puralox SCCa 2/150 (trademark) pre-shaped support using aqueous slurry phase impregnation and drying, followed by direct fluidised bed calcination in air, and reduction in hydrogen.

The two catalysts contained different levels of the Pd reduction promoter:
Example 17 (invention): 0.0025 g Pd/g Co;
Example 18 (comparative): 0.0050 g Pd/g Co.

The catalysts of Examples 17 and 18 were prepared in the same manner as that of Example 3, apart from using palladium nitrate as palladium precursor (instead of the platinum precursor) and adjusting the amount of palladium precursor to ensure that the correct composition was obtained. The catalyst of Example 17 is according to the invention, while that of Example 18 is comparative.

EXAMPLE 19

The catalysts of Examples 17 and 18 were tested in a fixed bed high throughput reactor system, using FTS inlet conditions of about 3.0 bar(a) (300 kPa(a)) $H_2O$, 6.3 bar(a) (630 kPa(a)) $H_2$ and 4.5 bar(a) (450 kPa(a)) CO, and obtaining outlet conditions of around 4.4 bar(a) (440 kPa(a)) $H_2O$, 4.6 bar(a) (460 kPa(a)) $H_2$ and 3.9 bar(a) (390 kPa(a)) CO, which was achieved with a syngas conversion of around 25% The reaction temperature was 230° C. Comparative tests using clean syngas feed not containing any N-containing compounds, and contaminated syngas feed containing 5000 vppb $NH_3$ were carried out.

After five days of operation, the relative activity and $CH_4$ selectivity data obtained were as reported in Table 9.

When performing FTS in the presence of $NH_3$ the activity loss is less for catalysts containing less Pd The order of the activity is reversed in the presence of $NH_3$, i.e. the lower the catalyst Pd level the higher its activity (when $NH_3$ is present in the syngas)

EXAMPLES 20 and 21

Using Ru as Dopant

Two Fischer-Tropsch synthesis ("FTS") catalysts containing 30 g Co/100 g support (1.5 g Si/100 g Puralox SCCa 2/150) and promoted with ruthenium were prepared on a particulate modified 1.5 g Si/100 g Puralox SCCa 2/150 (trademark) pre-shaped support using aqueous slurry phase impregnation and drying, followed by direct fluidised bed calcination in air, and reduction in hydrogen.

The two catalysts contained different levels of the Ru reduction promoter:
Example 20 (invention): 0.0050 g Ru/g Co;
Example 21 (comparative): 0.024 g Ru/g Co.

The catalysts of Examples 20 and 21 were prepared in the same manner as that of Example 3, apart from using ruthenium nitrate as a ruthenium precursor (instead of the platinum precursor) and adjusting the amount of ruthenium precursor to ensure that the correct composition was obtained. The catalyst of Example 20 is according to the invention, while that of Example 21 is comparative.

EXAMPLE 22

The catalyst of Examples 20 and 21 were tested in a fixed bed high throughput reactor system, using FTS inlet conditions of about 3.0 bar(a) (300 kPa(a)) $H_2O$, 6.3 bar(a) (630 kPa(a)) $H_2$ and 4.5 bar(a) (450 kPa(a)) CO, and obtaining outlet conditions of around 4.4 bar(a) (440 kPa(a)) $H_2O$, 4.6 bar(a) (460 kPa(a)) $H_2$ and 3.9 bar(a) (390 kPa(a)) CO, which was achieved with a syngas conversion of around 25%. The temperature was 230° C. Comparative tests using clean syn-

TABLE 9

Relative activity and $CH_4$ selectivity after five days of FTS at 230° C. for Examples 9 and 10 using (i) a clean synthesis gas feed, not containing any N-containing compounds and (ii) a synthesis gas feed containing 5000 vppb $NH_3$.

| Catalyst | Pd level (g Pd/g Co) | Relative activity (clean gas; no N contaminants) | Relative activity (5000 vppb $NH_3$) | % $CH_4$ (C atom %) (clean gas; no N contaminants) | % $CH_4$ (C atom %) (5000 vppb $NH_3$) |
|---|---|---|---|---|---|
| Example 1 (invention) | 0 | 1.8 | 2.8 | 6.3 | 4.8 |
| Example 17 (invention) | 0.0025 | 3.0 | 2.8 | 6.4 | 5.7 |
| Example 18 (comparative) | 0.0050 | 3.1 | 2.5 | 7.0 | 6.2 |

Error in activity is ±0.1 units and error in $CH_4$ selectivity is ±0.1 percentage point.

It can be concluded from Table 9 that the catalyst activity of Pd containing cobalt catalysts decreases 7-19% when using a syngas feed that contains 5000 vppb $NH_3$.

It can surprisingly also be concluded from Table 9 that for the Pd containing catalysts gas feed not containing any N-containing compounds, and contaminated syngas feed containing 5000 vppb HCN, were carried out.

After five days of operation, the relative activity and $CH_4$ selectivity data obtained were as reported in Table 10.

TABLE 10

Relative activity and $CH_4$ selectivity after five days of FTS at 230° C. for Examples 20 and 21 using (i) a clean synthesis gas feed, not containing any N-containing compounds and (ii) a synthesis gas feed containing 5000 vppb HCN.

| Catalyst | Ru level (g Ru/g Co) | Relative activity (clean gas; no N contaminants) | Relative activity (5000 vppb HCN) | % $CH_4$ (C atom %) (clean gas; no N contaminants) | % $CH_4$ (C atom %) (5000 vppb HCN) |
|---|---|---|---|---|---|
| Example 1 (invention) | 0 | 1.8 | 2.8 | 6.3 | 4.8 |
| Example 20 (invention) | 0.0050 | 2.6 | 2.2 | 7.0 | 4.9 |
| Example 21 (comparative) | 0.024 | 3.1 | 2.0 | 7.0 | 5.7 |

Error in activity is ±0.1 units and error in $CH_4$ selectivity is ±0.1 percentage point.

It can be concluded from Table 10 that the catalyst activity of Ru containing cobalt catalysts decreases 15-35% when using a syngas feed that contains 5000 vppb HCN.

It can surprisingly also be concluded from Table 10 that for the Ru containing catalysts
- When performing FTS in the presence of HCN the activity loss is less for catalysts containing less Ru
- The order of the activity is reversed in the presence of HCN, i.e. the lower the catalyst Ru level the higher its activity (when HCN is present in the syngas)
- The $CH_4$ selectivity gain is the highest for the lowest Ru levels in the presence of HCN.

EXAMPLE 23

Using Re as Dopant

A Fischer-Tropsch synthesis ("FTS") catalysts containing 30 g Co/100 g Support (1.5 g Si/100 g Puralox SCCa 2/150) and promoted with Re was prepared on a particulate modified 1.5 g Si/100 g Puralox SCCa 2/150 (trademark) pre-shaped support using aqueous slurry phase impregnation and drying, followed by direct fluidised bed calcination in air, and reduction in hydrogen. This sample contained 0.0025 g Re/g Co (according to the invention).

Catalyst Example 23 was prepared in the same manner as that of Example 3, apart from using perrhenic acid ($HReO_4$) as a rhenium precursor (instead of the platinum precursor) and adjusting the amount of rhenium precursor to ensure that the correct composition was obtained.

EXAMPLE 24

Using $NH_3$ in the Syngas

The catalyst of Example 23 (invention, 0.0025 g Re/g Co) was tested in a fixed bed high throughput reactor system, using FTS inlet conditions of about 3.0 bar(a) (300 kPa(a)) $H_2O$, 6.3 bar(a) (630 kPa(a)) $H_2$ and 4.5 bar(a) (450 kPa(a)) CO, having a total pressure of 15 bar(a) (1500 kPa(a)) and obtaining outlet conditions of around 4.4 bar(a) (440 kPa(a)) $H_2O$, 4.6 bar(a) (460 kPa(a)) $H_2$ and 3.9 bar(a) (390 kPa(a)) CO. Reaction temperature of 230° C. was tested. The syngas feed contained 5000 vppb $NH_3$.

After five days of operation, the relative activity and $CH_4$ selectivity data obtained were as reported in Table 11.

TABLE 11

Relative activity and $CH_4$ selectivity after 5 days of FTS at 230° C. for Example 23 using (i) a clean synthesis gas feed not containing any N-containing compounds; and (ii) a synthesis gas feed containing 5000 vppb $NH_3$.

| $NH_3$ level in syngas feed | Relative activity | % $CH_4$ (C atom %) |
|---|---|---|
| 0 vppb (clean gas) | 3.4 | 6.7 |
| 5000 vppb | 2.3 | 4.8 |

Error in activity is ±0.1 units and error in $CH_4$ selectivity is ±0.1 percentage point.

It can be concluded from Table 11 that there is a notable activity loss when 5000 vppb $NH_3$ is present. There is also a notable selectivity gain in lower methane production when 5000 vppb $NH_3$ is present.

To summarize—
- It was thus surprisingly found that when FTS is carried out under conditions where N-contaminant levels in the syngas are above 100 vppb, a reduction in the level of dopants such Pd, Pt, Ru and Re in the catalyst results in lower methane selectivity (see Tables 1 to 11).
- Furthermore, it is known in the art that when FTS is carried out under conditions of no N-contaminants in the syngas, the use of no dopants in the catalyst results in unacceptable low activity compared to the same conditions but with dopants present in the catalyst (see Table 1, data for 0 HCN). From Tables 1 to 4 (data for 5000 ppb HCN or $NH_3$), it is clear that under conditions where N-contaminants are present in the syngas, the highest catalyst dopant levels do not result in the highest activity. This is surprising since it is known that when the syngas contains no N-contaminants, the higher the catalyst dopant level, the higher the catalyst activity.
- Another surprising result was that the activity for catalysts containing no dopant increased under N-contamination conditions compared to no N-contamination conditions (Tables 1 to 4). This is a reversal of the trend noticed when catalyst dopants are present, since it is clear from Table 1 that with catalyst dopants the activity decreases when switching from no N-contaminants to the presence of N-contaminants.

From the above, it is thus clear that when working under syngas N-contamination conditions, lower catalyst dopant levels (including no dopant being present) can be used, resulting in acceptable activity (compared to higher catalyst dopant levels under N-contamination), and a lower $CH_4$ selectivity (it is known that a lowering in $CH_4$ selectivity goes hand-in-hand with an increase in $C_{5+}$ selectivity) is also achieved, resulting in as more efficient process. Since the catalyst dopants are expensive, lower dopant levels results in a less costly catalyst. Furthermore, tolerance of significant levels of N-contaminants in the syngas mean that costly syngas processing to rid the syngas of such contaminants can be avoided or at least reduced.

The invention claimed is:

1. A process for producing hydrocarbons and, optionally, oxygenates of hydrocarbons, which process includes contacting a synthesis gas comprising hydrogen, carbon monoxide and N-containing contaminants selected from the group consisting of HCN, $NH_3$, NO, $R_xNH_{3-x}$ where R is a hydrocarbyl group and/or an oxygenated hydrocarbyl group and x is 1, 2 or 3, with R being the same or different when x is 2 or 3, $R^1$—CN where $R^1$ is a hydrocarbyl group, and heterocyclic compounds containing at least one nitrogen atom as a ring member of a heterocyclic ring of the heterocyclic compound, with the N-containing contaminants constituting, in total, at least 100 vppb but less than 1 000 000 vppb of the synthesis gas, at a temperature of at least 180° C. and a pressure of at least 10 bar(a), with a particulate supported Fischer-Tropsch synthesis catalyst which comprises a catalyst support, Co in catalytically active form supported on the catalyst support, and a dopant selected from the group consisting of platinum (Pt), palladium (Pd), ruthenium (Ru), rhenium (Re) and a mixture of two or more thereof at a dopant level expressed by formula 1:

$$\frac{w}{0.024}Ru + \frac{x}{0.0030}Pd + \frac{y}{0.0025}Pt + \frac{z}{0.1}Re = a$$

where
  w is expressed as g Ru/g Co, and w<0.019 g Ru/g Co;
  x is expressed as g Pd/g Co;
  y is expressed as g Pt/g Co;
  z is expressed as g Re/g Co, and z<0.005 g Re/g Co; and
  0<a<1, to obtain hydrocarbons and, optionally, oxygenates of hydrocarbons, by means of Fischer-Tropsch synthesis reaction of the hydrogen with the carbon monoxide.

2. A process according to claim 1, wherein the catalyst contains the dopant and 0.07<a<0.93.

3. A process according to claim 2, wherein the catalyst contains only Ru as dopant.

4. A process according to claim 2, wherein the catalyst contains only Pd as dopant, and x<0.0028 g Pd/g Co.

5. A process according to claim 2, wherein the catalyst contains only Pt as dopant, and y<0.0023 g Pt/g Co.

6. A process according to claim 1, wherein the catalyst contains only Re as dopant.

7. A process according to claim 1, wherein the synthesis gas contains at least 200 vppb but less than 100 000 vppb total N-containing contaminants.

8. A process according claim 1, wherein the synthesis gas is free of phosphorous containing compounds.

9. A process according to claim 1, wherein the Fischer-Tropsch synthesis reaction takes place in a slurry bed Fischer-Tropsch reactor, with wax products being produced.

10. A process according to claim 1, which includes subjecting the hydrocarbons, and, when present, the oxygenates of hydrocarbons, to hydroprocessing, thereby to convert them to liquid fuels and/or to chemicals.

* * * * *